(12) United States Patent
Chhuor et al.

(10) Patent No.: US 9,893,485 B2
(45) Date of Patent: Feb. 13, 2018

(54) DATA TRANSFER CONNECTOR, SYSTEM AND METHOD

(71) Applicant: Lenovo Enterprise Solutions (Singapore) Pte. Ltd., Singapore (SG)

(72) Inventors: CheKim Chhuor, Shanghai (CN); Zhende Fu, Shanghai (CN); Yu Yu, Hangzhou (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/203,920

(22) Filed: Jul. 7, 2016

(65) Prior Publication Data
US 2017/0077664 A1 Mar. 16, 2017

(30) Foreign Application Priority Data

Sep. 14, 2015 (CN) .......................... 2015 1 0584065

(51) Int. Cl.
| | | |
|---|---|---|
| *H04B 7/00* | (2006.01) | |
| *H01R 43/26* | (2006.01) | |
| *H04W 4/00* | (2018.01) | |
| *H04L 12/24* | (2006.01) | |
| *H04B 5/00* | (2006.01) | |
| *H01R 13/62* | (2006.01) | |
| *H01R 13/66* | (2006.01) | |

(52) U.S. Cl.
CPC ......... *H01R 43/26* (2013.01); *H01R 13/6205* (2013.01); *H01R 13/665* (2013.01); *H01R 13/6675* (2013.01); *H04B 5/0031* (2013.01); *H04L 41/08* (2013.01); *H04W 4/008* (2013.01)

(58) Field of Classification Search
CPC ............................. H01R 43/26; H01R 13/6205
USPC ......................................................... 455/41.2
See application file for complete search history.

(56) References Cited

U.S. PATENT DOCUMENTS

| | | | |
|---|---|---|---|
| 8,758,025 B1 * | 6/2014 | Liljegren | H01R 13/6205 439/39 |
| 2009/0064338 A1 * | 3/2009 | Campbell | G06F 11/3058 726/26 |

* cited by examiner

*Primary Examiner* — Ayodeji Ayotunde
(74) *Attorney, Agent, or Firm* — Jeffrey L. Streets (57) ABSTRACT

A connector for data transfer is provided. The connector comprises a connector body having a coupling mechanism, and a communication module for communicating with a first data processing device and a second data processing device. The communication module is arranged with respect to the connector body such that upon the coupling mechanism being coupled to the first data processing device, the communication module is positioned with respect to the first data processing device to effect close-range wireless communication between them to enable a data transfer between the first and second data processing device. A data processing system and a method of carrying out data transfer between a first and second data processing device are also provided.

20 Claims, 4 Drawing Sheets

DATA TRANSFER CONNECTOR, SYSTEM AND METHOD

CROSS-REFERENCE TO RELATED APPLICATIONS

This application claims priority under 35 U.S.C. § 119 to Chinese Patent Application No. 1510584065X filed Sep. 14, 2015, the entire text of which is specifically incorporated by reference herein.

BACKGROUND

Field of the Invention

The present invention relates to data transfer from one computing device to another computing device.

Background of the Related Art

Onsite server maintenance and support is sometimes necessary. For onsite service of the servers, a technician or other support personnel connects a server management console to the individual server, for example using a cable, to configure the server. It is often a tedious and time-consuming process to establish a data communication link between the individual server and the management console. Alternatively, wireless communication protocols such as Bluetooth or WiFi may be used. However, Bluetooth requires pairing of the devices, which may take up to 20-30 seconds. Similarly, WiFi may take a prolonged period of time to establish the connection.

On the other hand, Near Field Communication (NFC) protocol has an advantage of rapid connection between devices (which may take only $1/10^{th}$ of a second). However, the devices are typically required to be brought in very close proximity (such as less than 4 cm) to establish a communicative coupling between devices. For a small amount of data, it is possible to complete data transfer or exchange within one second or a few seconds. However, a longer interaction time may be required to accomplish some operations, such as a firmware update, remote control, or diagnostics where the technician would be required to hold the management console close to the server for several minutes. Moreover, in a datacenter or other server environment that typically requires high data storage and/or management capacity, modular servers are typically used, such as rack-mounted servers or blade servers.

Figure 1:
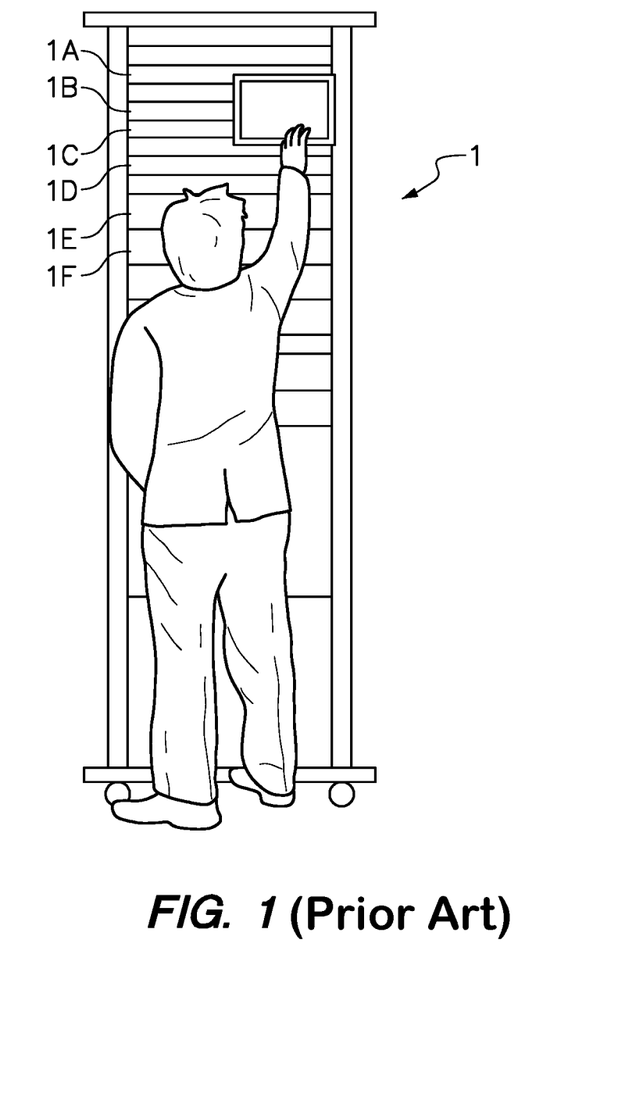
FIG. 1 illustrates a server cabinet housing a number of servers and a user attempting to perform updating of one of the servers.

Referring to FIG. 1, there are a plurality of servers 1A, 1B, 1C, 1D, 1E, 1F housed in various racks of a server cabinet 1 which measures about close to 2 meters high or even taller to maximize physical storage efficiency. However, interacting with servers above the technician's normal operating height range (e.g. servers located near the top rack of the chassis) can be tedious and uncomfortable especially when the duration required for data transfer is long. Therefore, an improved method and system for carrying out data transfer is desired.

BRIEF SUMMARY

One embodiment of the present invention provides a connector for data transfer comprising a connector body having a coupling mechanism configured for releasably coupling to a first data processing device, and a communication module secured to the connector body and adapted to communicate with a second data processing device, wherein coupling the coupling mechanism to the first data processing device positions the communication module with respect to the first data processing device to effect close-range wireless communication between the communication module and the first data processing device to enable a data transfer between the first data processing device and the second data processing device.

Another embodiment of the present invention provides a data processing system comprising a first data processing device, and a connector for data transfer. The connector comprises a connector body having a coupling mechanism configured for releasably coupling to the first data processing device, and a communication module secured to the connector body and adapted to communicate with the first data processing device and a second data processing device, wherein coupling the coupling mechanism to the first data processing device positions the communication module with respect to the first data processing device to effect close-range wireless communication between the communication module and the first data processing device to enable a data transfer between the first data processing device and the second data processing device.

A further embodiment of the present invention provides a method of transmitting data between a first data processing device and a second data processing device using a data transfer connector. The method comprises releasably attaching a coupling mechanism of the data transfer connector to the first data processing device to position a communication module of the data transfer connector with respect to the first data processing device to effect close-range wireless communication between the communication module and the first data processing device, wherein the first data processing device includes a close-range wireless communication device and the communication module includes a close-range wireless communication device. The method further comprises establishing a communication link between the communication module and the first data processing device, and transmitting data between the first data processing device and the second data processing device via the communication module.

BRIEF DESCRIPTION OF THE SEVERAL VIEWS OF THE DRAWINGS

In order that the advantages of the various embodiments will be readily understood, a more particular description of the various embodiments briefly described above will be provided by reference to specific exemplary embodiments that are illustrated in the accompanying drawings, which depict only exemplary embodiments and are not to be considered to be limiting in scope. The various embodiments are to be described and explained with additional specificity and detail through the use of the accompanying drawings, in which.

DETAILED DESCRIPTION

One embodiment of the present invention provides a connector for data transfer comprising a connector body having a coupling mechanism configured for releasably coupling to a first data processing device, and a communication module secured to the connector body and adapted to communicate with a second data processing device, wherein coupling the coupling mechanism to the first data processing device positions the communication module with respect to the first data processing device to effect close-range wireless communication between the communication module and the first data processing device to enable a data transfer between the first data processing device and the second data processing device.

The close-range wireless communication may employ a near-field communication (NFC) protocol. In another example, the close-range wireless data communication protocol employs an infrared (IR) protocol.

The coupling mechanism may be configured to be received by a part of a casing of the first data processing device. The coupling mechanism may be configured to form a mechanical coupling with the first data processing device. For example, in one embodiment, the coupling mechanism comprises a projection configured to engage a receptacle of the first data processing device. In other embodiments, the coupling mechanism comprises a magnet for forming a magnetic coupling with the receptacle of the first data processing device by a magnetic force.

The connector may further comprise an activation mechanism configured to initiate the close-range wireless communication in response to detecting that the coupling mechanism is coupled to the first data processing device.

In some embodiments, the communication module is operable to communicate with the second data processing device using a wireless communication protocol, such as Bluetooth. Alternatively or additionally, the communication module may be operable to communicate with the second data processing device using a wired data communication protocol.

In some embodiments, a length of the connector body is adjustable. For example, the connector body can be made telescopic.

The connector may further comprise a sensor module operable to detect a state of data communication between the communication module and the first data processing device.

The connector body, the communication module and the coupling mechanism may be integral.

In some embodiments, the connector further includes a power source.

Another embodiment of the present invention provides a data processing system comprising a first data processing device, and a connector for data transfer. The connector comprises a connector body having a coupling mechanism configured for releasably coupling to the first data processing device, and a communication module secured to the connector body and adapted to communicate with the first data processing device and a second data processing device, wherein coupling the coupling mechanism to the first data processing device positions the communication module with respect to the first data processing device to effect close-range wireless communication between the communication module and the first data processing device to enable a data transfer between the first data processing device and the second data processing device.

The first data processing device may comprise a corresponding coupling mechanism adapted to engage the coupling mechanism of the connector. Furthermore, the first data processing device may be a server. Still further, the close-range wireless communication may employ a near-field communication (NFC) protocol.

A further embodiment of the present invention provides a method of transmitting data between a first data processing device and a second data processing device using a data transfer connector. The method comprises releasably attaching a coupling mechanism of the data transfer connector to the first data processing device to position a communication module of the data transfer connector with respect to the first data processing device to effect close-range wireless communication between the communication module and the first data processing device, wherein the first data processing device includes a close-range wireless communication device and the communication module includes a close-range wireless communication device. The method further comprises establishing a communication link between the communication module and the first data processing device, and transmitting data between the first data processing device and the second data processing device via the communication module.

In one embodiment, there is provided a method of configuring a server using a hand-held data processing device, the method comprising releasably attaching a coupling mechanism of a data transfer connector to the server to position a communication module of the data transfer connector with respect to the server to effect close-range wireless communication between them, establishing a communication link between the communication module and the hand-held data processing device, transmitting server data from the server to the hand-held data processing device via the communication module, generating a command using the hand-held data processing device in response to the server data, and transmitting the command to the server via the communication module to configure the server.

The term "close-range wireless communication protocol" refers to a data communication protocol which requires two or more data communication couplers to be brought into proximity to a pre-defined distance of 20 cm or less in order to establish data communication between the couplers. The pre-defined distance may alternatively be 15 cm or less, or 10 cm or less. In some embodiments, the pre-defined distance is 5 cm or less, 4 cm or less, or even 1 cm or less. The close-range wireless communication protocol includes, but is not limited to, NFC and Infrared.

One embodiment of the present invention provides a connector comprising a connector body having a coupling mechanism which is arranged to be coupled to a first data processing device in order to position a communication module to effect close-range wireless communication between the first data processing device and the communication module. The communication module is configured to be in communication with a second data processing device such that data transfer can be carried out between the first data processing device and the second data processing device using the connector.

This allows the connector to be temporarily secured to the first data processing device and be held in the data transfer position for data transfer. In other words, the connector is "self-attaching" and this may obviate the need for the user to position and manually hold the second data processing device in close proximity to the first data processing device in order to maintain the close-range communication link, which could be tedious and uncomfortable especially when the time required for data transfer is long.

FIGS. 2A-2D are referred to collectively and show a data transfer connector 10 according to one embodiment of the present invention. The connector 10 has a connector body 12 which has a coupling mechanism 14 arranged to be coupleable to a first data processing device, for example, a blade server 16.

The coupling mechanism 14 is arranged to be releasably attached to the server 16 by engaging with a corresponding coupling mechanism 15 of the server 16. In this example, the corresponding coupling mechanism 15 includes a receptacle 15A located on a casing or enclosure of the server 16 adapted to receive the coupling mechanism 14.

The coupling mechanism 14 comprises an annular protrusion 14A projecting from a generally flat face 12A of the connector body 12. The connector body 12 may be rigid or flexible. The annular protrusion 14A is arranged to cooperate with the receptacle 15A in the casing of the server 16 to form a mechanical coupling thereby holding the connector body 12 in place with respect to the server 16. In this example, the receptacle 15A is an annular-shaped recess. Nevertheless, it will be understood that other shapes of the protrusion and the corresponding receptacle are possible too.

In the embodiment shown in FIGS. 2A-2D, the coupling mechanism 14 further comprises a magnet 14B arranged to form a magnetic coupling (by magnetic force) with another magnet 15B (in a form of an electromagnetic ring; see FIG. 2D) arranged in the receptacle 15A of the casing. For example, the magnet 14B may form at least a part of the annular protrusion 14A for engaging the receptacle 15A. The annular-shaped coupling mechanism 14 may allow the connector body 12 to be attracted firmly at any orientation to the server 16 as the magnets 14B, 15B are brought into close proximity. Note that either or both of the magnets 14B, 15B are optional. For example, in one variation, only one of the magnets 14B or 15B is provided, and that one magnet is capable of forming a magnetic coupling with the other member, which is made of a ferromagnetic material.

In another example, the coupling mechanism 14 may simply be arranged to engage the corresponding mechanism 15 by a mechanical coupling, such as the annular protrusion 14A and the receptacle 15A. In other words, instead of having the annular protrusion 14A projecting from the generally flat surface 12A, the coupling mechanism 14 may simply be a magnet provided beneath the generally flat surface of the connector body, which is arranged to couple the connector body 12 to the casing of the server 16 by magnetic force. In this case, the corresponding mechanism 15 of the server 16 may simply be a flat surface with a magnet 15B provided beneath the casing of the server 16 to hold the connector body 12 by magnetic force. Additionally or alternatively, at least a part of the casing of the server 16 may simply be made of a ferromagnetic material, which would be magnetically attracted to the magnet 14B of the connector body 12 to secure the connector body 12 in place. Optionally, providing the coupling mechanism 14 with an annular shape may allow the connector body 12 to be attracted firmly at any orientation to the server 16 as the magnets 14B and 15B are brought into close proximity.

The connector 10 further comprises a communication module 18 for communicating with the server 16 using a close-range wireless communication protocol, such as a near-field communication (NFC) protocol or an infrared (IR) protocol. In this particular example, the communication module 18 includes a near-field communication (NFC) chip 18A which is communicatively coupleable to a NFC chip 20 of the server 16. The NFC chip 20 may be arranged in close proximity with respect to an outer surface of a casing of the server 16. In some embodiments, the NFC chip 20 is embedded in the casing or otherwise attached to the casing of the server 16. This facilitates the NFC chip 20 to be positioned within a pre-defined distance (typically within 10 cm or within 5 cm for the NFC protocol) to establish NFC communication with the communication module 18 when the connector body 12 is brought into close proximity to an exterior of the casing.

The communication module 18 further has a wired and/or wireless communication coupler operable to communicate with a second data processing device (not shown), for example, a mobile phone. As shown in FIGS. 2A-2D, a wired cable 22 is provided to couple the communication module 18 for communication with the mobile phone. This allows the data received by NFC chip 18A to be transferred to the mobile phone via the cable 22. For example, the cable 22 is configured to connect to a data port of the second data processing device, which could be an industry standard mini-USB connector or an Apple Lightning connector for instance.

Figure 2A:
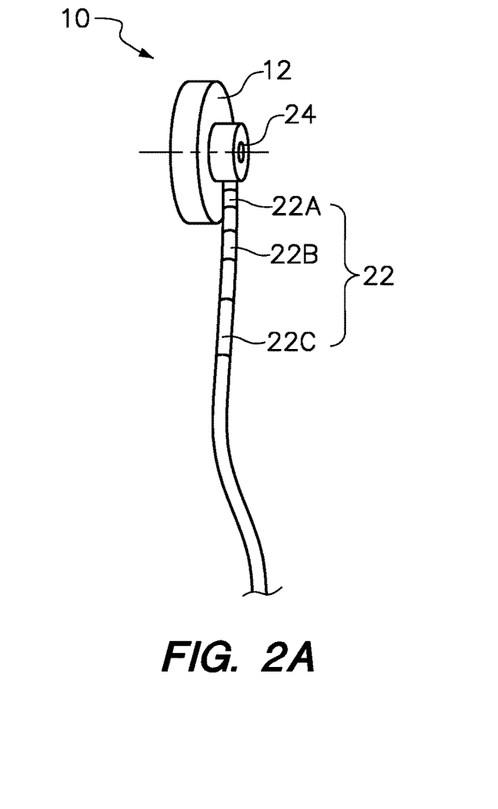
FIG. 2A is a perspective view of a connector of a data transfer apparatus according to one embodiment of the present invention.
Figure 2B:
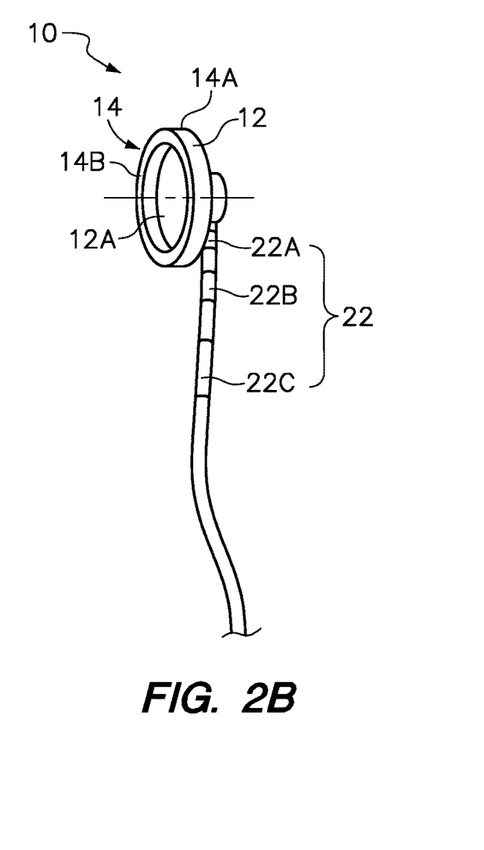
FIG. 2B shows the connector from another perspective.
Figure 2C:
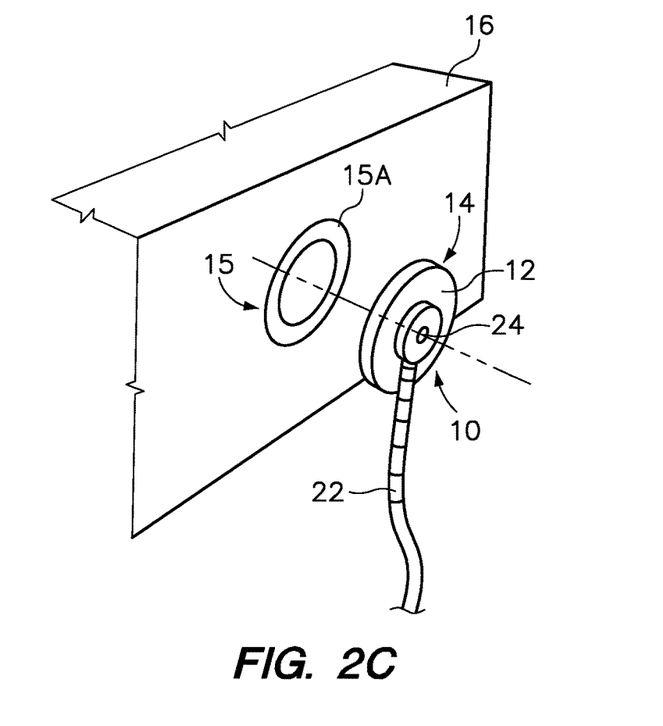
FIG. 2C shows the connector aligned for attachment with a coupling mechanism of a server.

In this embodiment, a length of the cable 22 extending between the server 16 and the second data processing device is adjustable. Note that a standard 42U server chassis measures about 1.86 meter high, within which a plurality of servers are arranged at racks of various heights. As shown in FIGS. 2A-2B, an end of the cable 22 proximate the connector body 12 may have a plurality of segments 22A, 22B, 22C which are telescopic with respect to one and another. In other words, the cable 22 is retractable just like a retractable radio antenna. This makes it convenient to carry out data transfer when the connector 10 is attached to and/or held at a server which is located at a height outside of a normal operating range of a user, for example, when the server 16 is located above a height of the user, or below a waist or knee level of the user. In that case, the user may extend or shorten the length of the cable 22 between the second data processing device and the server 16 so that he can operate the second data processing device at a comfortable height. For example, the telescoping cable may make it easier for a shorter person to interact with a server located at the top of a tall rack, or a taller person to interact with a server located at the bottom at ease, without bending the body when the connector 10 is held in the data transfer position with respect to the server 16. A person skilled in the art would understand that there are other implementations possible. For example, an anchor may be provided at the connector body 12 such that a portion of the cable 22 can be manually or automatically wound up about the anchor to an appropriate length.

In some embodiments, instead of having a wired cable 22, the communication module 18 has a wireless communication coupler for communicating with the second data processing device using a wireless communication protocol, such as (i) Bluetooth®, (ii) Infrared, (iii) WiFi or (iv) Zigbee®.

The communication module 18 is arranged with respect to the connector body 12 such that upon the coupling mechanism 14 being coupled to the server 16, the communication module 18 is positioned with respect to the server 16 to enable the NFC communication between them. In this example, the NFC chip 18A in the connector body 12 and NFC chip 20 of the server 16 are brought into close proximity and into alignment to allow data transfer using the NFC protocol. This allows for data transfer between the second data processing device and the server 16 through the cable 22 and the NFC chips 18A, 20.

In some embodiments, the connector 10 may further comprise a sensor module operable to detect a state of data communication between the server 16 and the second data processing device via the communication module 18. A visual indicator, such as a LED 24, may be coupled to the sensor module to provide a user with information on a status of data transfer. For example, the LED 24 may illuminate when data transfer is taking place between the server 16 and the second data processing device. In a further example, a blinking red light may be used to signal the user not to interrupt the connection between the connector 10 and the server 16 for ongoing data transfer. The LED 24 may also be used to provide a visual indication as to a connection status between the second data processing device and the server 16, such as when a communicative link has been established and is ready for data transfer, as will be described in more detail later. The power for illuminating the LED 24 may be provided by the server 16. Alternatively, a dedicated power supply, such as a battery, may be provided within the connector 10 itself.

Alternatively or additionally, the sensor module may be operable to detect a state of data communication between the communication module 18 and the server 6, or the sensor may be operable to detect a state of data communication between the communication module 18 and the second data processing device.

In some embodiments, the second data processing device has a power source for powering data transfer through the cable 22. Additionally or alternatively, the power source may be provided at the connector 10. The connector 10 may have a power source coupled to the communication module 18 to power the data transfer, for example, especially when the communication module 18 is configured to transmit data wirelessly to the second data processing device.

Figure 3:
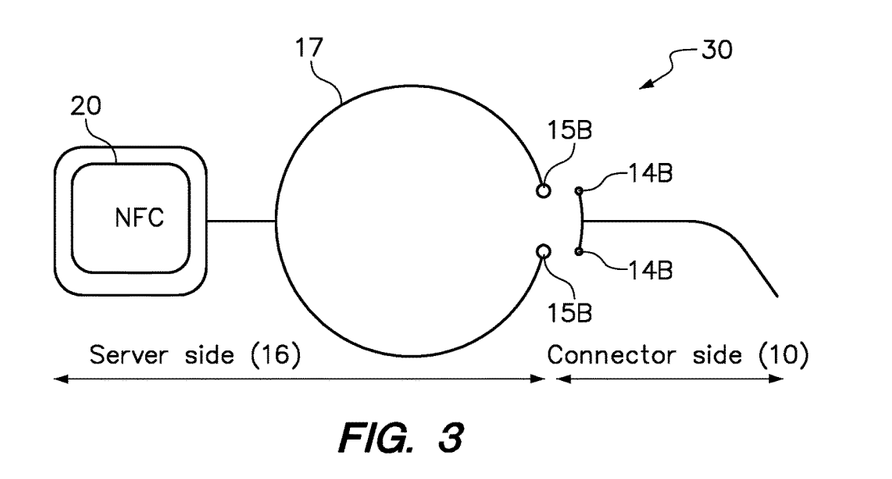
FIG. 3 is a schematic diagram of one example of an activation mechanism according to another embodiment of the present invention.

FIG. 3 schematically illustrates an activation mechanism 30 which can be optionally provided. The activation mechanism 30 is configured to activate communication between the NFC chip 18A of the communication module 18 and the NFC chip 20 of the server 16 upon the coupling mechanism 14 being coupled to the server 16.

As shown in FIG. 3, the magnet 15B is configured to be electromagnetically coupled to the NFC chip 20 of the server 16. Upon the magnet 14B of the connector 10 being attached to the corresponding coupling mechanism, e.g. the magnet 15B, the NFC chip 20 is enabled (e.g. switched on) to establish a communication link with the NFC chip 18A. In the example illustrated by FIG. 3, the NFC chip 20 is enabled as a closed circuit formed to electrically connect the NFC chip 20 and the connector 10. In this example, the detection of a closed magnetic or conductive loop is programmed as an activation signal for activating the NFC chip 20. As described earlier, the LED 24 may illuminate (e.g. green light) to indicate readiness for communication as the connection is established.

A skilled person would appreciate that there are other ways of detecting an attachment between the coupling mechanism and the corresponding mechanism and/or implementing the activation mechanism.

In use, the coupling mechanism 14 can be releasably attached to the corresponding coupling mechanism 15 of the server 16 to hold the connector body 12 in a data transfer position. This physical position enables the communication module 18 to communicate with the server 16 using a close-range wireless communication protocol for data transfer from the server 16 to the communication module 18 or vice versa. The communication module 18 relays the data to the second data processing device via the communication coupling thereby effecting data transfer between the server 16 and the second data processing device.

In the embodiments illustrated above, the communication module 18 is embedded in the connector body 12. However, in some embodiments, the communication module 18 may be made releasably coupleable to the connector 12. Similarly, it will be understood that the coupling mechanism 14 may be integral to the connector body 12 or may be releasably coupleable to the connector body 12.

Although the above embodiment is illustrated with respect to the blade server 16, it should be understood that the server 16 may be any other type of server, such as a rack-mountable server or any modular server components which are typically configured to be housed in a server cabinet or server chassis.

It should be also understood that the second data processing device may be any other data processing device, such as a tablet computer, a laptop computer, a smart watch, a MP3 player, or a GPS device.

Figure 4:
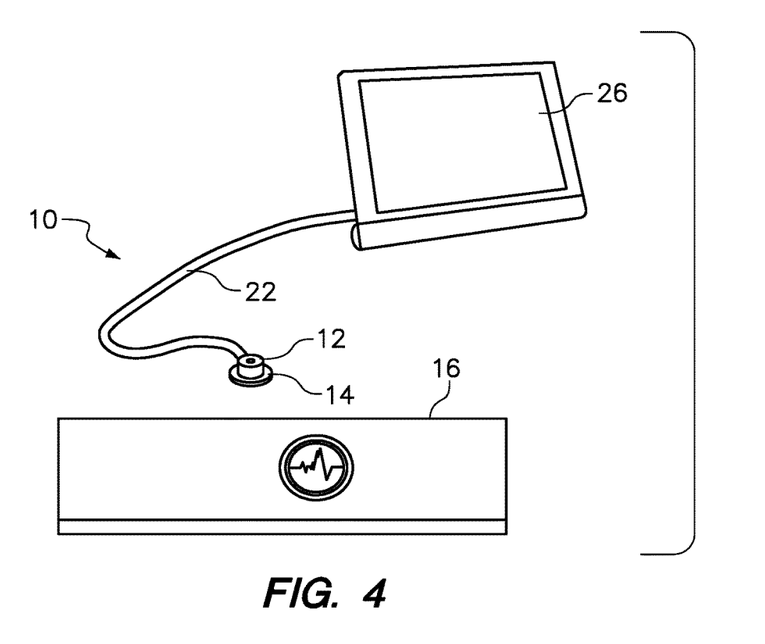
FIG. 4 is a schematic diagram of a hand-held data processing device, such as a tablet computer, using a data transfer connector to connect with a server.

According to one particular example, the data transfer connector 10 of the present invention may be used for on-site configuration of servers in a data center. For example, as shown in FIG. 4, the data transfer connector 10 allows the use of a hand-held data processing device, such as a tablet computer 26, as a console to configure the server 16. In use, a technician or other personnel attaches the data transfer connector 10 to the server 16 via the coupling mechanism 14, which then positions the communication module of the connector 10 with respect to the server 16 to effect close-range wireless communication (e.g. NFC) between them. While the connector 12 is not shown to be connected to the server 16 in FIG. 4, it should be understood that a connection may be established as described in reference to FIGS. 2C and 2D.

Therefore, a communication link can be established between the tablet computer 26 and the data transfer connector 10 to allow server data to be transmitted to the tablet computer 26 via the communication module within the connector 10. The technician may then review the server data on the tablet computer 26 and use the tablet computer 26 to generate a command for configuring the server 16. As will be familiar to a skilled person, such a command may be generated by any software application which supports NFC functionality. The command may then be sent to the server 16 via the communication module 18, wherein the command may serve to configure the server 16. Any number of commands and any amount or type of data may be transferred in either direction between the tablet computer 26 and the server 16. At the end of the process, the attachment to the server 16 may then be released, and the connector 10 may be used for configuring another server in a similar manner. Configuring the server may include, for example, modifying firmware of the server, or managing other data stored on or otherwise in communication with the server, such as a part of a data center.

Figure 2D:
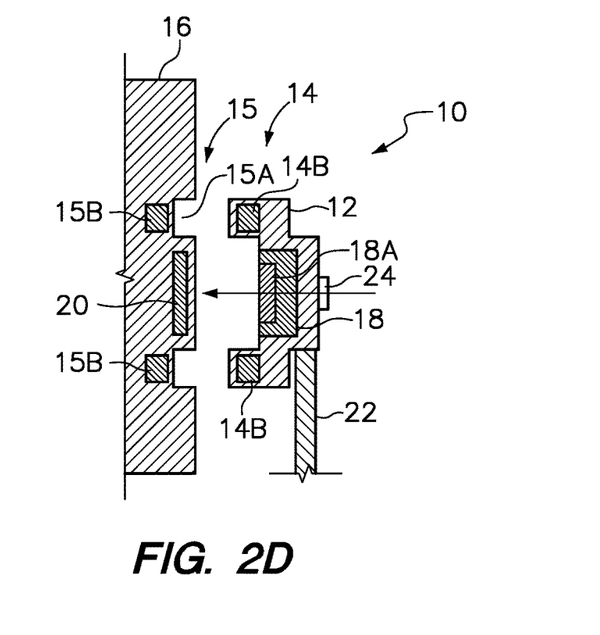
FIG. 2D is a cross-sectional view of the connector and the server of FIG. 2C.

While the foregoing description has described exemplary embodiments, it will be understood by those skilled in the art that many variations of the embodiments can be made consistent with the present invention. For example, the locations of the magnet and the NFC coupler on the connector (or on the server) as shown in FIG. 2D are interchangeable.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on a non-transitory computer readable storage medium that can direct a computer, other programmable data processing apparatus, or other devices to function in a particular manner, such that the program instructions stored in the computer readable storage medium produce an article of manufacture including the program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A connector for data transfer, comprising:
   a connector body having a coupling mechanism, wherein the coupling mechanism comprises a projection configured for releasably coupling to a receptacle of a first data processing; and
   a communication module secured to the connector body and adapted to communicate with a second data processing device;
   wherein coupling the coupling mechanism to the first data processing device positions the communication module with respect to the first data processing device to effect close-range wireless communication between the communication module and the first data processing device to enable a data transfer between the first data processing device and the second data processing device.

2. The connector of claim 1, wherein the close-range wireless communication employs a near-field communication protocol.

3. The connector of claim 1, wherein the close-range wireless data communication protocol employs an infrared protocol.

4. The connector of claim 1, wherein the coupling mechanism is configured to be received by a part of a casing of the first data processing device.

5. The connector of claim 1, wherein the coupling mechanism comprises a magnet for forming a magnetic coupling with the receptacle of the first data processing device.

6. The connector of claim 1, further comprising:
   an activation mechanism configured to initiate the close-range wireless communication in response to detecting that the coupling mechanism has been coupled to the first data processing device.

7. The connector of claim 1, wherein the communication module is operable to communicate with the second data processing device using a wireless communication protocol.

8. The connector of claim 1, wherein the communication module is operable to communicate with the second data processing device using a wired data communication protocol.

9. The connector of claim 1, wherein a length of the connector body is adjustable.

10. The connector of claim 9, wherein the connector body is telescopic.

11. The connector of claim 1, further comprising:
    a sensor module included with the connector body, wherein the sensor module is operable to detect a state of data communication between the communication module and the first data processing device.

12. The connector of claim 1, wherein the connector body, the communication module and the coupling mechanism are integral.

13. The connector of claim 1, further comprising:
    a battery with the connector for providing power to the communication module.

14. A data processing system comprising:
    a first data processing device; and
    a connector for data transfer, the connector comprising:
      a connector body having a coupling mechanism, wherein the coupling mechanism comprises a projection configured for releasably coupling to a receptacle of the first data processing device; and
      a communication module secured to the connector body and adapted to communicate with the first data processing device and a second data processing device;
    wherein coupling the coupling mechanism to the first data processing device positions the communication module with respect to the first data processing device to effect close-range wireless communication between the communication module and the first data processing device to enable a data transfer between the first data processing device and the second data processing device.

15. The data processing system of claim 14, wherein the coupling mechanism comprises a magnet for forming a magnetic coupling with the receptacle of the first data processing device.

16. The data processing system of claim 14, wherein the first data processing device is a server.

17. The data processing system of claim 14, wherein the close-range wireless communication employs a near-field communication protocol.

18. The data processing system of claim 14, further comprising:
    an activation mechanism configured to initiate the close-range wireless communication in response to detecting that the coupling mechanism has been coupled to the first data processing device.

19. The data processing system of claim 14, further comprising:
    a sensor module operable to detect a state of data communication between the communication module and the first data processing device; and
    a light emitting diode to indicate the detected state of data communication.

20. The data processing system of claim 14, further comprising:
    a battery with the connector for providing power to the communication module.

* * * * *